United States Patent
Crecelius et al.

(10) Patent No.: US 6,414,832 B1
(45) Date of Patent: Jul. 2, 2002

(54) THERMAL PROTECTION DEVICE FOR A REMOTELY REGULATED VEHICLE ALTERNATOR

(75) Inventors: David R. Crecelius, Noblesville; Richard J. Voss, Kokomo, both of IN (US)

(73) Assignee: Delco Remy America, Inc., Anderson, IN (US)

( * ) Notice: Subject to any disclaimer, the term of this patent is extended or adjusted under 35 U.S.C. 154(b) by 0 days.

(21) Appl. No.: 09/533,328

(22) Filed: Mar. 23, 2000

Related U.S. Application Data

(60) Provisional application No. 60/127,029, filed on Mar. 31, 1999.

(51) Int. Cl.[7] .............................. H02H 1/00; H02H 5/04
(52) U.S. Cl. ...................................... 361/120; 361/106
(58) Field of Search ................................. 361/103, 120, 361/31, 106, 23, 27; 322/28, 24, 31, 33, 34

(56) References Cited

U.S. PATENT DOCUMENTS

| | | | |
|---|---|---|---|
| 4,415,849 A | 11/1983 | Sievers et al. ................ 322/99 |
| 4,716,486 A | 12/1987 | Sobiepanek et al. .......... 361/24 |
| 4,792,877 A | 12/1988 | Thornton ...................... 361/24 |
| 5,057,962 A | 10/1991 | Alley et al. ................... 361/24 |
| 5,116,136 A | 5/1992 | Newman et al. ............. 374/102 |
| 5,168,415 A | 12/1992 | Osuga ........................... 361/28 |
| 5,215,834 A | 6/1993 | Reher et al. ................... 429/62 |
| 5,345,126 A | 9/1994 | Bunch ........................... 310/68 |
| 5,451,853 A | 9/1995 | Itoh .............................. 318/788 |
| 5,546,262 A | * 8/1996 | Baurand et al. ............... 361/13 |
| 5,712,802 A | 1/1998 | Kumar et al. ............... 364/557 |
| 5,831,405 A | 11/1998 | Massie ........................ 318/471 |
| 5,869,969 A | 2/1999 | Cividino et al. ............ 324/431 |
| 5,925,996 A | 7/1999 | Murray ....................... 318/471 |
| 5,955,793 A | * 9/1999 | Khadkikar et al. ......... 307/117 |
| 6,150,793 A | * 11/2000 | Lesesky et al. ............. 320/104 |
| 6,222,349 B1 | * 4/2001 | LeRow et al. ................ 322/34 |

* cited by examiner

Primary Examiner—Rajnikant B. Patel
(74) Attorney, Agent, or Firm—James D. Wood; Jay G. Taylor; Ice Miller

(57) ABSTRACT

The present invention provides an apparatus for reducing the allowed output current from an electrical device such as a high output capacity vehicle alternator in response to a sensed over temperature condition. In one embodiment, a thermistor is attached to the housing of an alternator to provide temperature sensing capability. As temperature exceeds a temperature set point established by a resistor bridge, op-amps, in combination with a power FET in series with the alternator field windings, act to reduce the allowed current output from the alternator in proportion to the extent the set point temperature has been exceeded. As the alternator temperature returns to below the set point, the output current restriction is reduced such that the allowed current flow is maximized without exceeding the temperature set point.

36 Claims, 5 Drawing Sheets

THERMAL PROTECTION DEVICE FOR A REMOTELY REGULATED VEHICLE ALTERNATOR

This application claims the benefit of U.S. Provisional Application No.: 60/127,029 filed Mar. 31, 1999.

FIELD OF THE INVENTION

This invention relates to the field of motor vehicle alternators, and more particularly to the field of temperature based controls of the output of high output capability alternators such as those found in large city busses and coaches.

BACKGROUND INFORMATION

Vehicle alternators with high output capability are used in large vehicles such as trucks, busses and passenger coaches. The alternator provides current for the vehicle which is used to charge the vehicle's battery or to run various auxiliary systems. When the alternator is operating as a generator of electricity, some amount of heat is also generated by the alternator. As the current demand on the alternator is increased, the alternator will attempt to generate more electricity, thereby increasing the heat generated.

Under conventional circumstances, the alternator may be cooled by circulating oil through the alternator housing and around the internal components of the alternator. In a basic system, cool oil is pumped into the alternator. The heat generated by the internal components of the alternator is then transferred to the comparatively cooler oil, thus cooling the alternator components and heating the oil. The heated oil is then conveyed out of the alternator to a heat exchanger where the oil is cooled so that it can be recirculated to the alternator for further cooling.

In the above system, there are two separate heat exchanges occurring. In the first heat exchange, heat is transferred from the alternator to the oil. In the second heat exchange, heat is transferred from the oil to the atmosphere. In heat exchanger systems such as this, the amount of heat transferred is highly dependent on the difference in temperature between the component or fluid from which heat is being removed and the component or fluid to which heat is being moved. For vehicle based systems, the heat transferred from the oil is ultimately transferred to the air surrounding the vehicle. Consequently, the amount of heat transferred from the oil to the air, and then from the alternator to the oil, is influenced by the temperature of the ambient air. Thus, as the ambient air temperature increases, the heat transfer capacity of the cooling system decreases.

A design problem that must be addressed in vehicle alternators is that as the ambient temperature increases the use of generated electricity for some components, such as air conditioners used for the comfort of passengers, also increases. In response to this increased demand for electricity, the alternator produces more electricity and necessarily generates more heat. Consequently, as the need for heat removal from the generator increases, the system's capacity for heat removal is decreased.

This type of system is subject to several potential failures resulting in elevated temperature of the alternator, possibly to the extent that the design temperature of the alternator is exceeded. While catastrophic failures resulting in over temperature conditions, such as a pump seizure or loss of electrical power, can occur at any time, a reduced capacity for heat removal can exacerbate otherwise nominal problems resulting in an over temperature condition. For example, the oil pump performance could become degraded, thereby limiting the amount of oil available for cooling the alternator. Additionally, the oil system could develop a leak or flow blockage restricting the amount of oil circulated through the alternator.

In the event that cooling oil flow is restricted or interrupted, the amount of heat conducted out of the alternator is reduced or eliminated. Consequently, the temperature of the alternator will increase. Should the reduced oil flow occur during periods of high current demand, the alternator temperature may exceed its maximum design operating temperature. Operating at a temperature in excess of design operating temperature can lead to stressing components beyond their design limits resulting in component failure. Depending on which component fails, the high temperature could result in an oil leak, reduced alternator output or even complete failure of the unit. Consequently, a vehicle may suffer catastrophic failure, resulting in passenger discomfort from loss of air conditioning or even stranding the passengers by complete shutdown of the vehicle. Additionally, restricted oil flow could result from a clogged oil filter which could otherwise be quickly and easily replaced at a minimal cost. The damage resulting from operating the alternator at high temperature, however, could necessitate costly and time consuming component replacement or repair.

It is readily apparent from the foregoing discussion that the severity of an alternator failure can be assessed according to two factors. The first factor is the loss of electric generating capability while the second factor is the cost of repairs. Therefore, it is desirable to provide a control system for high output capacity vehicle alternators, which minimizes operation at elevated temperatures, while avoiding complete loss of electricity generating capability and damage to the equipment.

Various devices have been used in other arts to avoid the extreme damage caused by operating electric equipment at elevated temperatures. One such device is disclosed in U.S. Pat. No. 5,546,262 issued to Baurand et al. Baurand et al. discloses a device which uses a thermistor to monitor the operating temperature of a load. A thermistor is simply a resistor which changes resistance as its temperature changes. The resulting voltage drop across the resistor is then used, typically by comparing the voltage to a reference voltage, to activate other devices. A device according to Baurand et al., in response to a high temperature condition of a load monitored by a thermistor, can interrupt power to the load thereby avoiding the catastrophic damage which could be caused by operating the load at elevated temperature.

Although the device of Baurand et al. is useful in many applications, it is of limited benefit when used to protect high capacity output alternators. As noted above, an essential factor in assessing the severity of an alternator failure is the loss of generating capability. While Baurand et al. does ameliorate the potential for damage to a piece of equipment, it does so by shutting the equipment off. This device would disable the vehicle in an over temperature condition, stranding the passengers. This is a severe shortcoming of Baurand et al. if used in conjunction with a vehicle alternator.

Baurand et al. also discloses the use of a bimetallic strip as a means for protecting an electrical load. A bimetallic strip is merely two smaller strips of metal which are joined into a single strip. A bimetallic strip operates under the principle that as the amount of current passing through the strip increases, the bimetallic strip heats up, in the same manner as any other resistor. The difference, however, is that the two metals used in a bimetallic strip expand at different rates as they are heated. Thus, the strip begins to curl as more current passes through it. At a designed current/temperature level, the strip will curl such that the electrical circuit is broken and current is no longer supplied to the load. After some amount of time, the strip cools down and returns to its original shape, thus closing the electrical circuit and current can once more be passed to the load.

The use of a bimetallic strip does mitigate damage due to operating a piece of equipment when too much current is being demanded, however, like the thermistor device of Baurand et al., a bi-metallic strip is not appropriate for use in a high capacity output alternator for a vehicle. The use of bi-metallic strips would sacrifice the operation of the alternator as a consequence of protecting the alternator from damage.

There is a significant need, therefore, to provide a control device which protects an electrical piece of equipment, such as an alternator, from over temperature conditions. Preferably, the device should not totally de-energize the electrical equipment, rather it should gradually decrease the current available to the equipment. Upon easing of the over temperature condition, the device should allow resumption of full capacity operation. The device should not require penetrations be made through the alternator housing to minimize the potential for oil leaks. The device should be easy to install on new equipment, it must also be easy to retro-fit onto existing equipment, the device should be inexpensive, comprise a minimum number of components, be relatively small, not require long leads, be compatible with other protective devices, not be subject to failure in extreme operating environments and be of simple construction.

BRIEF SUMMARY OF THE INVENTION

The present invention provides a control device which protects an electrical piece of equipment, such as an alternator, from over temperature conditions. Advantageously, the present invention gradually lowers the allowed current output from an alternator in providing over-temperature protection so that there is not a total interruption of current output. Upon easing of the over-temperature condition, the invention allows resumption of full capacity current production. The invention does not require penetrations be made through the alternator housing in retrofitting or installation with new equipment, and thus, minimizes the potential for oil leaks. The invention is easy to install on new equipment, as well as easy to retro-fit onto existing equipment. Further, the invention is inexpensive, comprises a minimum number of components, is relatively small, does not require long leads, and is compatible with other protective devices, and is not subject to failure in extreme operating environments while being of simple construction.

In accordance with the present invention, a sensing means monitors the temperature of the alternator and produces an output signal representative of the sensed temperature. The output signal is passed to a variable current control device which is used to control the allowed output current from the alternator. A temperature sensor is mounted on the alternator housing to sense the temperature of the alternator. In response to an over temperature condition, a power field effect transistor is alternately energized and de-energized thus interrupting the current flow through the field winding of an alternator, thus reducing the current generated by an alternator and reducing the heat generated by the alternator.

DETAILED DESCRIPTION

Figure 1:
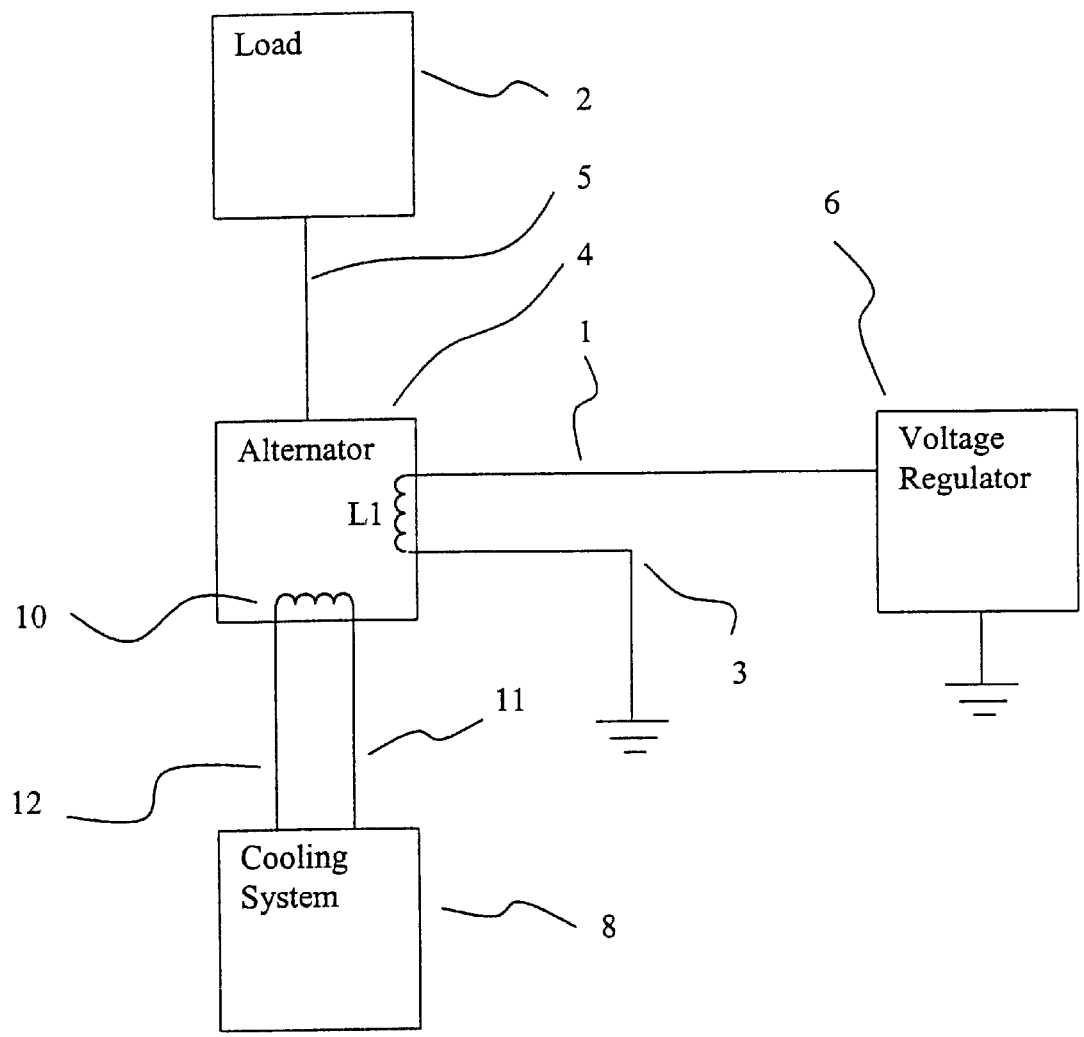
FIG. 1 is a block diagram of a conventional prior art remotely regulated alternator.

Referring to FIG. 1, a simplified block diagram of a conventional prior art alternator is shown. Alternator 4 generates electrical current on output conductor 5 connected to load 2. Conductor 3 provides a path to ground from field winding L1 of alternator 4. A voltage regulator 6 may be connected to conductor 1 to control the current in the field winding L1 of alternator 4 to control the voltage of the output of alternator 4 to protect any voltage sensitive components of load 2. A cooling system 8 may optionally be provided to cool alternator 4 as alternator 4 creates internal heat as a result of generating electrical current. Cooling system 8 may comprise an oil cooling system that pumps cool oil into heat exchanger 10 through input conduit 11 and heated oil out through output conduit 12. Other alternators may be air cooled without an oil cooling system.

Figure 2:
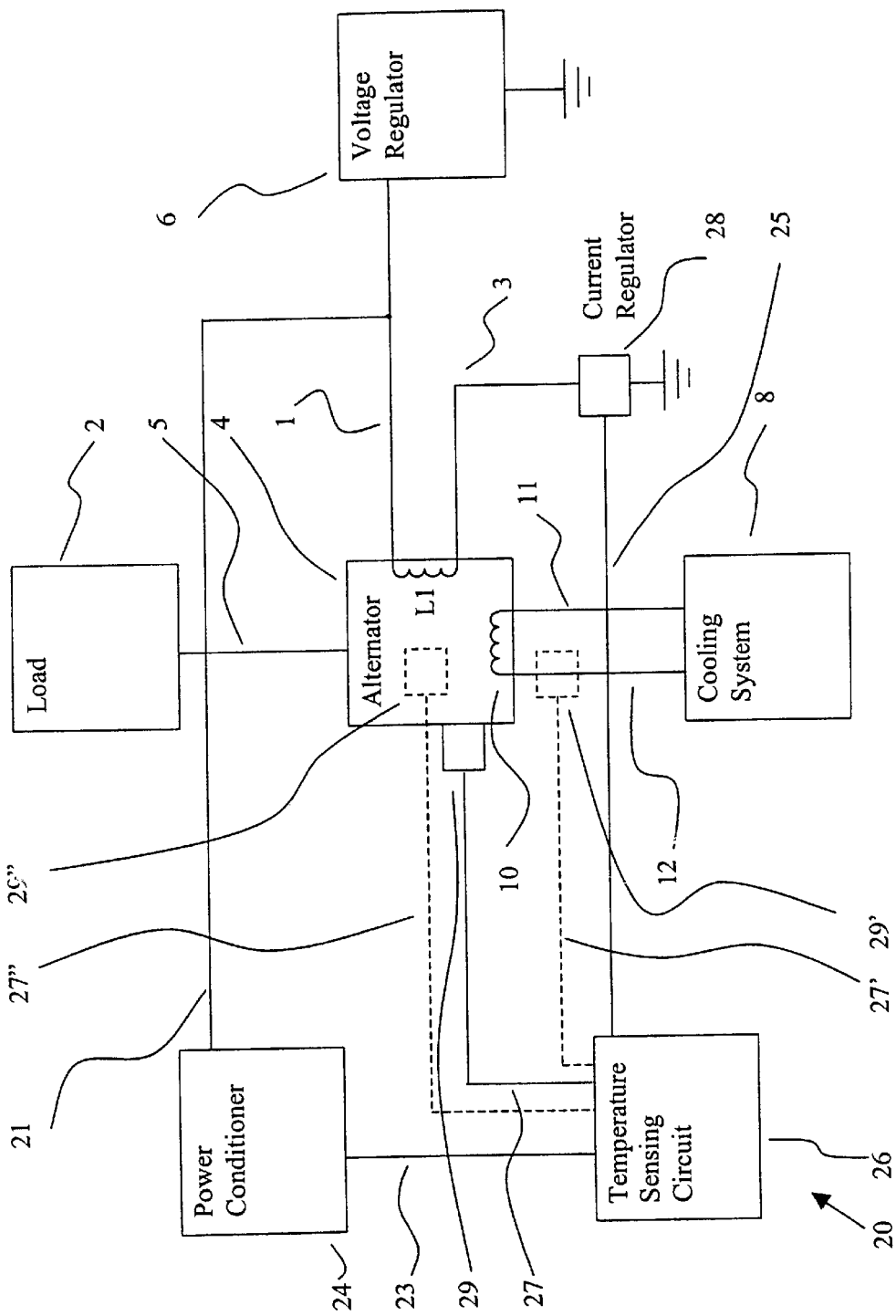
FIG. 2 is a block diagram of a thermal protection device for a remotely regulated vehicle alternator in accordance with the present invention.

Referring now to FIG. 2, a simplified block diagram of thermal protection device 20 for a remotely regulated alternator in accordance with the present invention is shown with the alternator of FIG. 1. Operating power for thermal protection device 20 is supplied through conductor 21 connected between conductor 1 and power conditioner 24. Power conditioner 24 is operably connected to temperature sensing circuit 26 by conductor 23, and current regulator 28 is operably connected to temperature sensing circuit 26 by conductor 25. Temperature sensor 29, mounted to alternator 4, is operably connected by conductor 27 to temperature sensing circuit 26, to provide a signal indicative of the temperature of alternator 4. Current from alternator 4 to load 2 is regulated by field current passing through current regulator 28 under the control of temperature sensing circuit 26. As the sensed temperature of alternator 4 exceeds a predetermined threshold, the amount of current allowed to pass through current regulator 28 is decreased, thus lessening the field current which reduces the generated current, and therefore the heat generated by alternator 4 is reduced.

Temperature sensor 29' can be placed at the output of heat exchanger 10 to sense the temperature of the heated oil thereby measuring temperature representative of the internal temperature of alternator 4 depending on the flow rate and the input temperature of the oil in alternators having an oil cooling system. It is also possible to place temperature sensor 29" inside alternator 4 on, for example, the stator laminated stack or other component of alternator 4, to measure the temperature of the stator laminated stack or other component. It is also possible to place the temperature sensor on the exterior of the alternator at a location where the temperature will be a direct representation of the internal temperature. The placement of the sensor will depend on a number of variables. For example, in the case of certain alternators, the laminated stack temperature is the limiting temperature, but the laminated stack is imbedded within the alternator housing. In that case, it may be desired to place the sensor on the exterior of the alternator housing at a temperature representative location. In alternators wherein the limiting component is not directly contacting the alternator housing, it may be desired to measure the oil outlet temperature. These variations and others are within the scope of the present invention.

Referring now to FIG. 2, the general operation of an embodiment of the present invention is described. In operation, alternator 4 is providing current to load 2 through output conductor 5. The output current of alternator 4 is governed by voltage regulator 6 in the conventional manner. Heat generated by alternator 4 in supplying current to load 2 is removed by cooling system 8 through heat exchanger 10. Under normal conditions, the heat removal capacity of cooling system 8 is such that when supplying maximum output current, the temperature of alternator 4 is within its maximum temperature limit.

The temperature of alternator 4 is sensed by temperature sensor 29 which conveys a corresponding signal to temperature sensing circuit 26 through conductor 27. Temperature sensing circuit 26 compares the sensed temperature to a predetermined threshold temperature. If the sensed temperature exceeds the predetermined threshold temperature, current regulator 28 is controlled by temperature sensing circuit 26 to limit the field current and thus the output current allowed to be supplied by alternator 4 to load 2 to an amount less than the maximum output current. Should the temperature of alternator 4 continue to increase, temperature sensing circuit 26 will sense this condition and current regulator 28 will further limit the allowed output current of alternator 4.

As the current output from alternator 4 is decreased, the heat generated by alternator 4 will also decrease. Therefore, at a current level less than the maximum output level, the temperature of alternator 4 will return to its maximum temperature limit as the heat generated by alternator 4 is removed by cooling system 8. Thus, current regulator 28 effectively establishes a first restricted current output based upon the sensed temperature of alternator 4.

At some point, either the current demanded by load 2 will drop below the first restricted current output level established by current regulator 28 or the heat removal capacity of cooling system 8 will increase. In either event, the temperature of alternator 4 will drop below the maximum temperature limit as the heat removed by cooling system 8 exceeds the heat generated by alternator 4. This drop in temperature is sensed by temperature sensing circuit 26 and current regulator 28 is controlled by temperature sensing circuit 26 to allow more current through the winding L1 thereby allowing more current to be supplied to load 2. If the drop in alternator temperature was due to increased cooling capacity, and load 2 has a demand greater than the first restricted current level, more current will be produced by alternator 4 and supplied to load 2. The additional current being generated produces more heat, driving the temperature of alternator 4 back toward its temperature limit. Thus, a new equilibrium will be established based upon the increased cooling capacity. The current level at this new equilibrium may be at the maximum current level or at a level intermediate the maximum current level and the first restricted current level.

Alternatively, if the drop in temperature is the result of a lessened current demand from load 2, the cooling capacity of cooling system 8 will exceed the heat generated by alternator 4 and temperature will return to a level below the maximum temperature limit. The lower temperature will be sensed by temperature sensing circuit 26 and current regulator 28 will return the allowed output current of alternator 4 to its maximum level.

Figure 3:
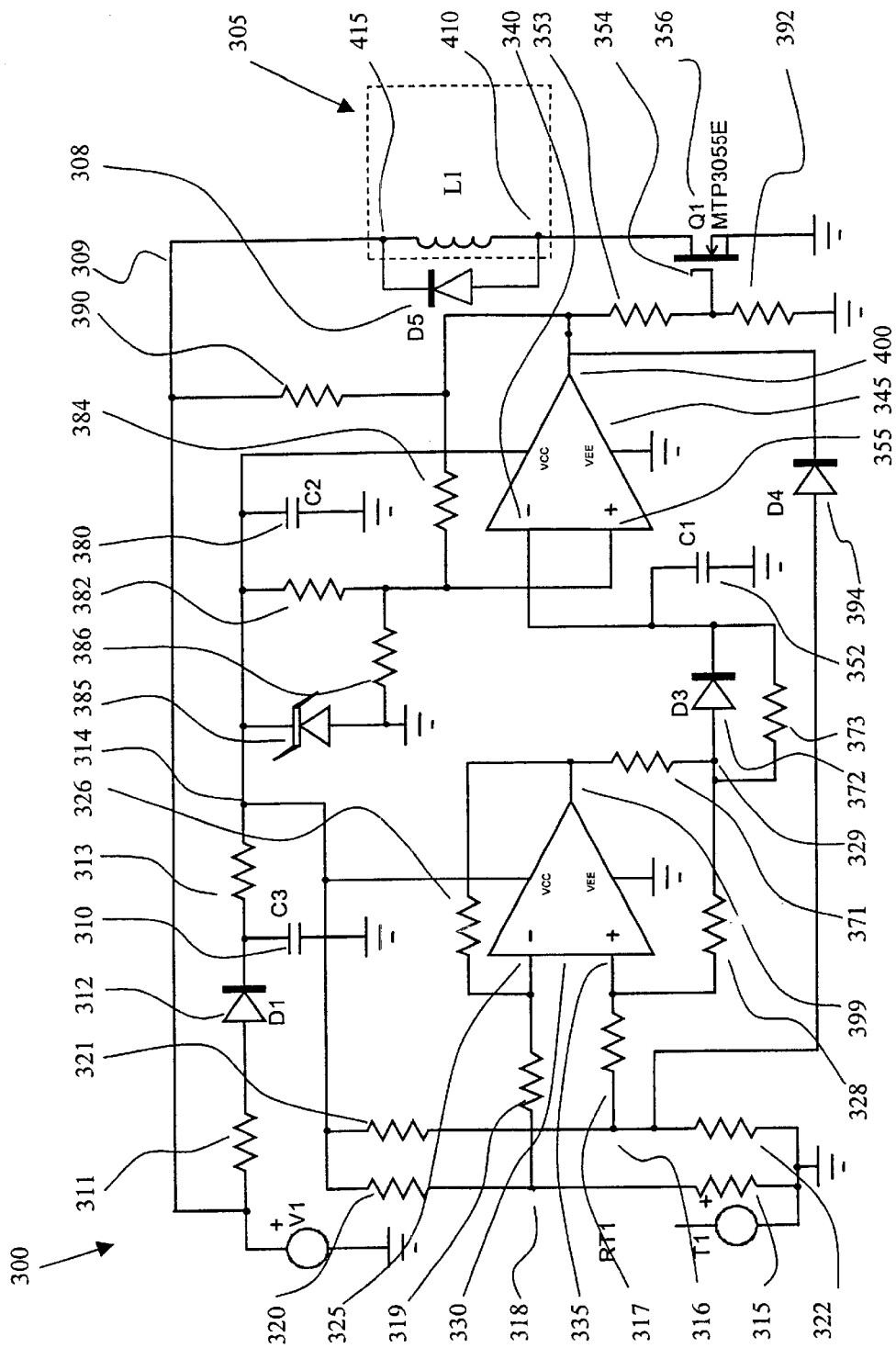
FIG. 3 is a schematic circuit diagram of an embodiment of the thermal protection device of the present invention.

A more detailed circuit diagram of a thermal protection device 300 according to the present invention is shown in FIG. 3. Power for thermal protection device 300 is supplied by voltage regulator 6 as it supplies voltage to the field windings L1 of alternator 305 (shown in dotted lines). Connected across field outputs 410 and 415 is diode 308 which protects thermal protection device 300 from inductive surges, produced as power field effect transistor (FET) 356 is cycled, by providing an alternate current path.

Alternator field output 415 is connected via conductor 309 to the series combination of resistor 311 and diode 312. Capacitor 310 is connected between the output of diode 312 and ground. Diode 312 prevents discharge of capacitor 310 when the field current is interrupted as will be discussed below. Capacitor 310 filters out the switching transients of the voltage and provides a stable power supply through resistor 313 to the other components of thermal protection device 300 at connection 314.

Capacitor 380 is connected between connection 314 and ground to provide a filter for high frequencies. Zener diode 385 is located between connection 314 and ground in parallel with other components of thermal protection device 300 to provide over voltage protection for the components powered from connection 314.

Because thermal protection device 300 in this embodiment is powered by voltage across field windings L1 of alternator 305, the size of capacitor 310 is critical. The current through field windings L1 may be intermittently perturbed by normal function of the voltage regulator as it intermittently interrupts the field voltage, however, certain components of thermal protection device 300 depend upon constant power for proper operation. Consequently, capacitor 310 must be sized to provide adequate power to thermal protection device 300 whenever current through windings L1 is perturbed.

In this embodiment, the series of thermistor 315 and resistor 320 is in parallel with the series of resistors 321 and 322 to form a bridge circuit between connection 314 and ground. The resistance of resistors 320, 321 and 322 in conjunction with thermistor 315 may be selected so as to determine the sensed temperature at which temperature op-amp 330 output will be altered as is well known in the art, thus serving as a means for establishing a temperature set point. As the resistance of thermistor 315 changes, the relative voltage at points 318 and 316 change due to the changes in resistance of thermistor 315.

Thermistor 315, may be of the type negative thermal coefficient thermistor commercially available from Keystone Electronics Corp. of Astoria, N.Y., or other comparable thermistors which exhibits a lowered resistance as its temperature increases. Thermistor 315 is operatively positioned relative to alternator 305 such that the temperature of alternator 305 influences the temperature of thermistor 315 in a manner proportional to the internal temperature of alternator 305. As described with respect to FIG. 2, thermistor 315 may be placed in a variety of positions relative alternator 305 or cooling system 8, as long as temperature of alternator 305 can be sensed directly or indirectly. Therefore, as temperature of alternator 305 increases, temperature of thermistor 315 increases and resistance of thermistor 315 decreases. Thus, voltage at point 318 decreases. Those of skill in the art will recognize that alternate circuits may be used. By way of example, but not of limitation, thermistor 315 may be replaced with a resistor and resistor 320 may be replaced with a positive temperature coefficient thermistor. This and other variations being within the scope of the present invention.

Point 318 is electrically connected through resistor 319 to inverting input 325 of op-amp 330. Op-amp 330 is connected as a one quadrant differential voltage to current converter and may be of the type M33172 commercially available from Motorola, Inc. of Austin, Tex. Point 316 is connected to non-inverting input 335 of op-amp 330 through resistor 317 to provide a first voltage threshold at non-inverting input 335 which is representative of the temperature set point. When the voltage at inverting input 325 drops below the voltage at non-inverting input 335, the output of op-amp 330 which is initially at a low value increases to a higher value, effectively turning op-amp 330 "on." Thermistor 315 thus provides a means for sensing temperature of alternator 305 so that when a predetermined temperature is reached, the voltage at point 318 will cause the output of op-amp 330 to increase.

The output of op-amp 330 is connected to inverting input 325 through connector 399 and resistor 326 and to non-inverting input 335 through connector 399 and resistor 371 in series with resistor 328. Thus, when the output of op-amp 330 is high, the voltage difference between point 318 and point 316 is impressed across resistor 371 and current flows from op-amp 330 through connector 399 and resistor 371 to point 329. Point 329 is connected to inverting input 340 of op-amp 345 via the parallel combination of diode 372 and resistor 373. Capacitor 352 is connected between non-inverting input 340 and ground. Thus, when the output of op-amp 330 increases to a higher value and current flows through resistor 371, capacitor 352 is charged and the voltage at inverting input 340 increases.

Non-inverting input 355 of op-amp 345 is connected through resistor 382 to connection 314 and through resistor 384 and connector 400 to the output of op-amp 345. Thus, when the output of op-amp 345 is high, resistor 382 and resistor 384 are effectively connected in parallel and serve as the upper leg of a voltage divider with resistor 386 providing the lower leg. The voltage divider thus provides a predetermined first reference voltage at non-inverting input 355 when the output of op-amp 345 is high. Op-amp 345 is, in this embodiment, connected as a very high hysteresis comparator, and is of the type MC33172.

The output of op-amp 345 is connected to base gate 354 of power (FET) 356 through connector 400 and resistor 353. Power FET 356 which may be of the type MTP3055E available from Motorola, Inc. of Austin, Tex., requires voltage to be present at base 354 in order to allow current to flow between field output 410 and ground through power FET 356. Thus, when the output of op-amp 345 is high, voltage is present at base 354 through a voltage divider between op-amp 345 output and ground consisting of resistor 353 and resistor 392. Consequently, thermal protection device 300 in this condition is "on" and does not restrict the flow of current through field windings L1 of alternator 305. In the event thermal protection device 300 is off or has been de-energized such that capacitor 310 is not charged sufficiently for proper operation of thermal protection device 300, normal alternator operation is allowed since voltage may be provided at base 354 from conductor 309 through resistor 390 and resistor 353 when thermal protection device 300 is inactive. The operation of alternator 305 may also be controlled by means well known in the art such as with a voltage regulator (not shown in FIG. 3).

The output of op-amp 345 is also connected to point 316 through diode 394. Diode 394 is oriented such that when the output of op-amp 345 is low, the voltage at connection 316, and thus the voltage at non-inverting input 335 of op-amp 330, is forced to be low. This forces the output of op-amp 330 to be low. Diode 394 thus operates as a means to turn off the current output of op-amp 330 when the output of op-amp 345 goes low or "off" by establishing a second voltage threshold.

Detailed operational description of thermal protection device 300 is made in reference to FIG. 3. When the temperature of alternator 305 is below the set point established by thermistor 315, resistor 320, resistor 322, and resistor 321, the resistance of thermistor 315 forces the voltage at point 318 to be higher than the voltage at point 316. Consequently, the voltage at inverting input 325 of op-amp 330 will be higher than the voltage at non-inverting input 335 of op-amp 330. Thus, the output of op-amp 330 will be low and capacitor 352 will not be charged.

The voltage at inverting input 340 of op-amp 345 is therefore lower than the voltage at non-inverting input 355 of op-amp 345, which, because the output of op-amp 345 is high, is determined by the voltage divider of resistor 386 and parallel resistors 382 and 384. The voltage divider of resistor 386 and parallel resistors 382 and 384 thus acts as a means for providing a first reference voltage for op-amp 345. Sufficient voltage is therefore present at base 354 of power FET 356 to cause power FET 356 to be turned on, allowing full field current and thus full output current flow, as determined by, for example, a voltage regulator or the demand on alternator 305.

As the temperature of alternator 305 increases, the resistance of thermistor 315 decreases and the voltage at point 318 decreases. When the voltage at point 318 is lower than the voltage at point 316, op-amp 330 output goes high and the voltage difference between point 316 and point 318 is impressed across resistor 371. Consequently, current flows from the out put of op-amp 330 through resistor 371. The current passes through diode 372 and charges capacitor 352. Capacitor 352 continues to charge until the voltage at inverting input 340 of op-amp 345 exceeds the voltage at non-inverting input 355 of op-amp 345 which is set by the voltage divider consisting of resistor 386 and the parallel resistors 382 and 384. When the voltage at inverting input 340 of op-amp 345 exceeds the voltage at non-inverting input 355 of op-amp 345, the output of op-amp 345 goes low, and voltage at base 354 of power FET 356 is forced low, turning power FET 356 off and interrupting the flow of current through winding L1 of alternator 305. The polarity of winding L1 is thus reversed, and diode 308 provides a current path as is well known in the art.

The low output of op-amp 345, due to the polarity of diode 394, also causes the voltage at point 316 to go low. Consequently, the voltage at point 318 is higher than the voltage at point 316, and op-amp 330 output is flipped back to low. This allows capacitor 352 to begin discharging through resistor 373 and resistor 371 through the output of op-amp 330 which is low. The series resistors 373 and 371 thus provide a discharge path for capacitor 352 and an RC time constant for a constant discharge rate.

Additionally, the low output of op-amp 345 acts to "reconfigure" the voltage divider initially provided by resistor 386 and the parallel resistors 382 and 384. Effectively, when the output of op-amp 345 is low, resistors 386 and 384 are in parallel and resistor 382 becomes the upper leg of a voltage divider. This causes the voltage at non-inverting input to drop, in this embodiment, to about one fourth of its previous value. Consequently, the output of op-amp 345 is held low until capacitor 352 discharges to a voltage one fourth of the voltage which initially caused the output of op-amp 255 to go low. Once capacitor 352 discharges sufficiently, the voltage at non-inverting input 355 will exceed the voltage at inverting input 340 and the output of op-amp 345 will once again go high. Thus, base 354 is biased so that current is once again allowed to flow through power FET 356 and, if the high temperature condition still exists, capacitor 352 begins to charge as described above. Under these conditions, the voltage divider comprising parallel resistors 386 and 384 and resistor 382 thus acts as a means for providing a second reference voltage for op-amp 345.

Thermal protection device 300 thus provides for temporary interruption of the current flow through alternator 305, the period of which is a function of the RC discharge rate of capacitor 352. Additionally, the period of interruption in this embodiment is also a function of the extent to which the temperature of alternator 305 exceeds the desired temperature. Specifically, the voltage at point 318 is a function of the sensed alternator temperature by way of thermistor 315. As the voltage at point 318 decreases in response to increasing temperature of alternator 305, the voltage difference impressed across resistor 371 increases and the flow of current through resistor to capacitor 352 likewise increases according to the process above described. Thus, as alternator temperature increases, op-amp 330 produces a variable current output that allows more rapid charging of capacitor 352, and thus a more rapid return to a condition of low output from op-amp 345. As the temperature of alternator 305 increases above the established temperature limit, the on time of power FET 356 is proportionally decreased, resulting in less allowed current flow through power FET 356 as temperature increases.

Those of skill in the art will recognize that in accordance with the above described embodiment, the discharge time of capacitor 352 is relatively constant. Thus, the time during which current is not allowed to flow through power FET 356 is relatively constant. The time required to re-charge capacitor 352, however, decreases as the sensed temperature increases. Consequently, the time that power FET 356 allows load current to flow is, in this embodiment, inversely related to the temperature of the over-temperature condition.

The above described embodiment further provides a means for limiting the allowed current reduction so as to maintain a minimum level of output current. As noted above, the charging time of capacitor 352 in this embodiment determines the time that current is allowed to flow through power FET 356. Consequently, establishing a minimum time to charge capacitor 352 effectively establishes a minimum output current level. Once the minimum current level is reached, further increase in temperature of alternator 305 will not result in further current limitation by thermal protection device 300. The minimum charge time in this embodiment is provided by the voltage at connection 314 which is limited by Zener diode 385. This voltage limits the maximum voltage input, voltage VCC, to op-amp 335 which in turn controls the maximum voltage which may be provided at the output of op-amp 335 and impressed across resistor 371. Consequently, the voltage at connection 314 limits the current which may flow through resistor 371 to charge capacitor 352.

The effect of the above described embodiment is that of a pulse width modulating system. When power FET 356 is off and current demand exceeds the allowed generator output, battery voltage will drop below the voltage regulator set point. The voltage regulator responds by attempting to provide maximum field current to the alternator. Consequently, actual allowed current output is fully controlled by thermal protection device 300. Thus, the cycling of power FET 356 serves as a means for variably controlling current output of alternator 305 by variably controlling the pulse width of the field current.

The determination of a temperature threshold for the initiation of current limiting activity as described above will depend on the particular alternator and its application. However, all alternators will have a limiting component which defines a maximum allowed temperature. For the purpose of example, alternator model 50DN commercially available from Delco Remy America, of Anderson, Ind. is briefly described. This alternator is manufactured, in part, by pressure fitting the stator laminated stack into the alternator housing. For considerations not herein discussed, the stator laminated stack comprises steel while the housing comprises aluminum. During normal operations this difference in composition is of no import. During high temperature operations however, the two metals expand at different rates, with the aluminum expanding more rapidly than the steel. Consequently, the fit of the stack in the housing becomes loose. The critical temperature for the Delco Remy 50DN, at which temperature the fit becomes unacceptably loose, has been determined through testing to be 140 degrees Celsius (C.).

Once the critical temperature for a particular alternator is understood, the determination of a desired temperature threshold may be accomplished according to practices commonly followed in the art. Additionally, the placement of the temperature sensing device may be determined. For example, the Delco Remy 50DN alternator is of a type which is oil cooled. Thus, directly sensing the stator laminated stack temperature would normally result in the difficulty and expense of creating penetrations through the housing of the alternator which would then result in increased susceptibility to oil leakage. The stator laminated stack temperature in the Delco Remy 50DN alternator, however, is directly related to the alternator housing temperature. The relationship between a critical component and a readily accessible location for monitoring temperature for a given alternator is readily determined by experimentation is well known to those of skill in the art. Once the relationship of the stator and housing temperature is established, stator temperature can be indirectly sensed by sensing the housing temperature, for example, via thermistor 315.

Figure 4:
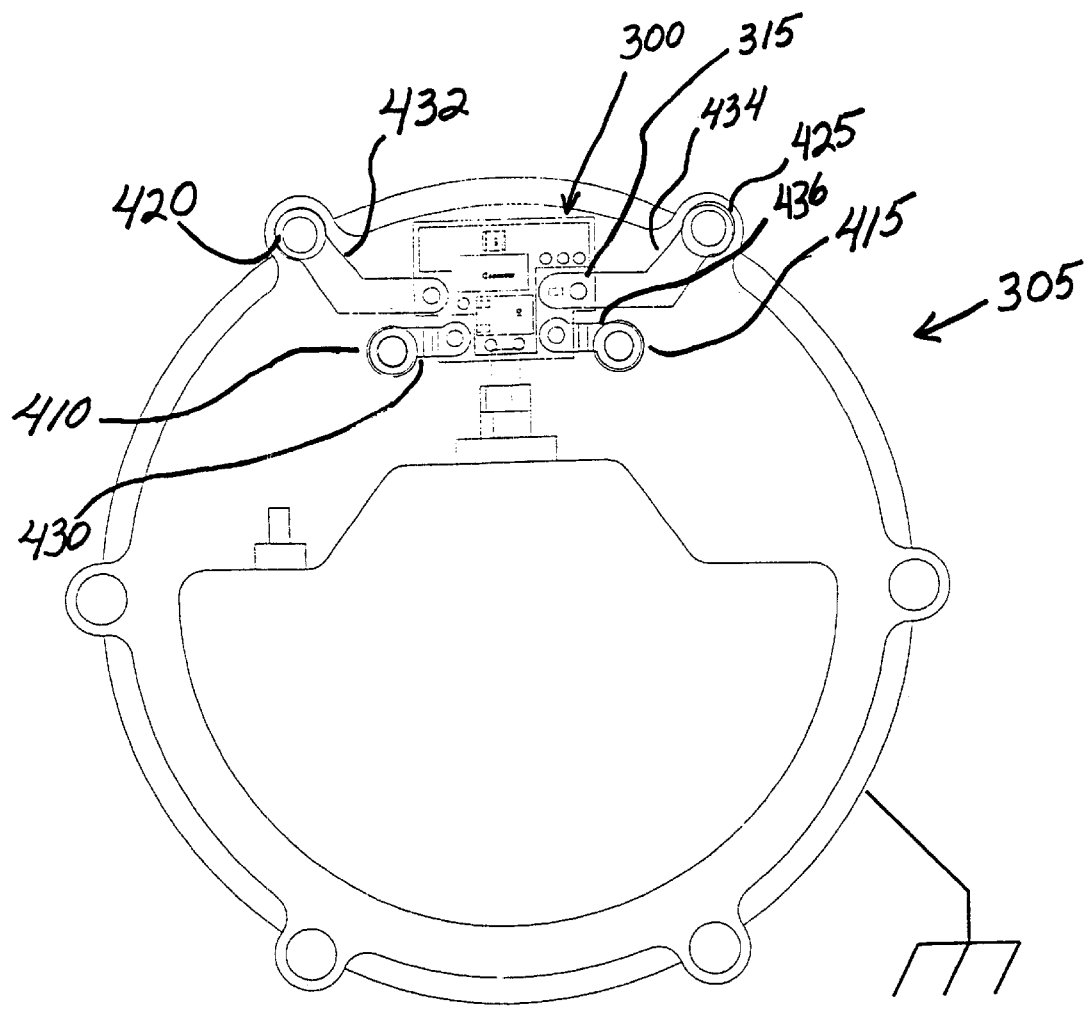
FIG. 4 is an end view of an alternator showing the mounting of an embodiment of a thermal protection device according to the present invention.

Referring to FIG. 4, an embodiment of a thermal protection device 300 of the type illustrated in FIG. 3, used to indirectly monitor stator laminated stack temperature is shown. Thermal protection device 300 is electrically connected to the rectifier end of alternator 305 on housing 401 at field coil output terminals 410 and 415 by mounting conductors 430 and 436. Housing bolts 420 and 425 physically attach mounting conductors 432 and 434 of device 300 to the housing 401 of alternator 305. This configuration allows the voltage at field coil terminals 410 and 415 to be used to power thermal protection device 300 in the manner described with reference to FIG. 3. Additionally, this mounting configuration allows for easy assembly during initial production or as a retrofit. No modifications or penetrations of housing 401 of alternator 305 are required to mount device 300, and the need for long external leads, for either the thermistor or the power supply, is eliminated.

Mounting conductors 430, 432, 434 and 436 of thermal protection device 300 in this embodiment are made of tin plated brass. Those of skill in the art will recognize that the salient properties of the material for fashioning terminals 430, 432, 434 and 436 are those of thermal and electrical conduction. Consequently, other materials comprising those properties are within the scope of the present invention. Electrical components in the circuit board are capable of high temperature operation (125 degrees C.) and are soldered to an FR4 circuit board (or ceramic substrate). The device is potted in an appropriate material, such as epoxy, once built to provide environmental protection and resistance to mechanical vibration.

Because thermal protection device 300 generates some heat when in operation, it is important to thermally isolate the heat generating components from the thermistor to reduce the risk of an unrepresentative temperature indication by thermistor 315. Also, power FET 356 is mounted in series to conductor 432, which acts as a heat sink for thermal protection device 300. Thermistor 315 is mounted in series with conductor 434 to housing bolt 425 of housing 401. Housing 401 is electrically grounded at housing bolt 425. As the temperature of housing 401 increases, conductor 434 conducts heat to thermistor 315 thereby varying its temperature. Thus, thermistor 315 indirectly measures the internal temperature of alternator 305 by sensing the temperature of housing 401 through conductor 434.

EXAMPLE

A test of an embodiment of the present invention as described in reference to FIG. 3 and FIG. 4 was conducted using a Delco Remy 50DN alternator. As noted above, a ground strap 434 was mounted on housing bolt 425, and due to the thermal properties of grounding strap 434, the temperature being sensed by thermal protection device is reflected in the temperature of grounding strap 434. A thermocouple was therefore connected to the ground strap to provide an indirect indication of the laminated stack temperature. Thermocouples were also attached to the alternator and cooling system to monitor the actual alternator stator lead temperature, laminated stack temperature and oil outlet temperature. Additionally, oil flow rate, and field voltage were monitored. As noted above, when the thermal protection device is controlling output current, field voltage will drop below the set point of the voltage regulator, thus providing an indication of alternator output current being controlled by the thermal protection device.

Figure 5:
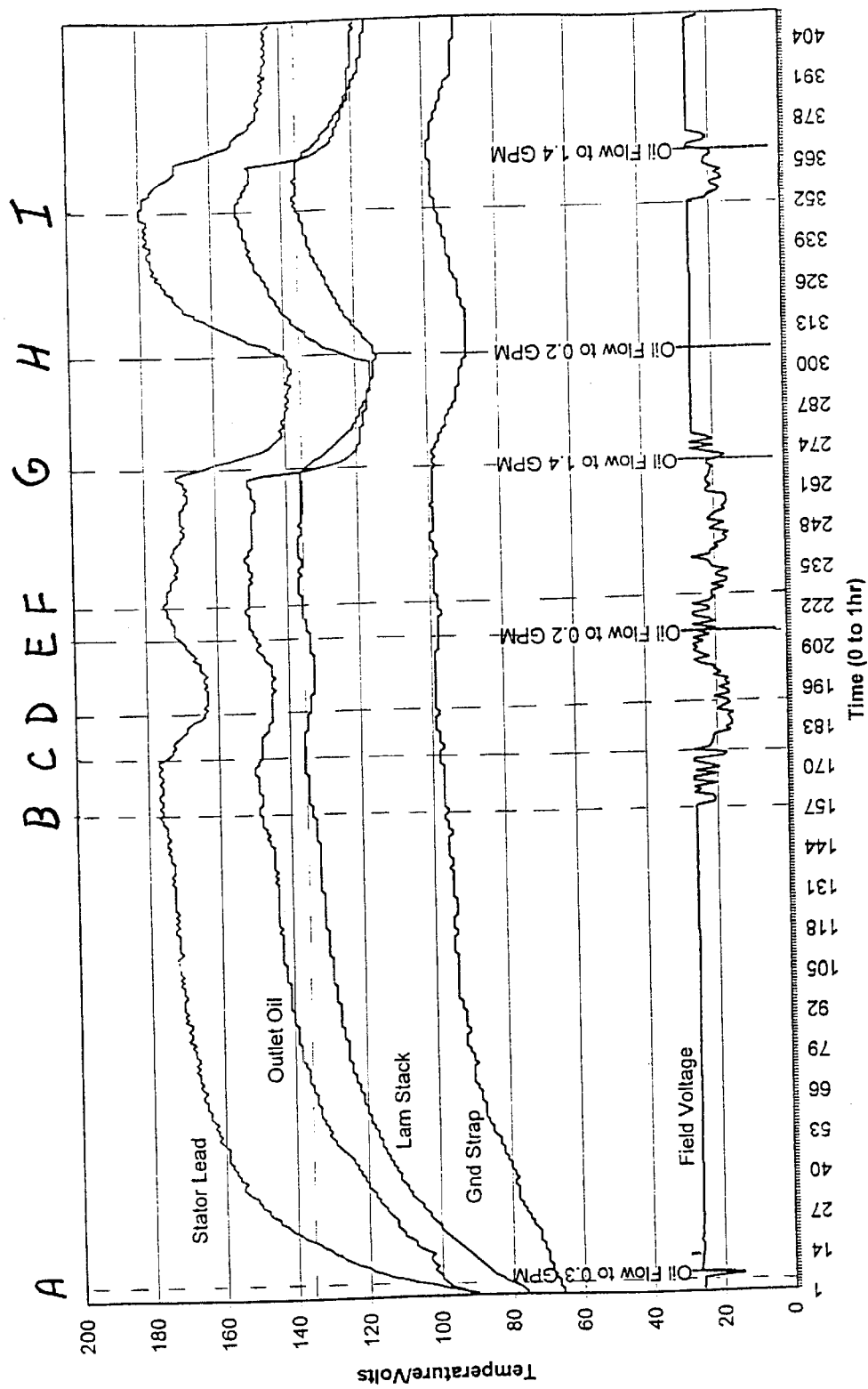
FIG. 5 is a graph of test results for an embodiment of a thermal protection device mounted to an alternator in accordance with the present invention.

The alternator was loaded to run at full field at 2100 RPM with an output voltage of 27.5 volts. The coolant oil was initially heated to 93 degrees C. to facilitate establishment of steady state operating parameters and a flow rate of 1.4 GPM into the alternator was initiated. An overheating condition was created by decreasing oil flow rate to 0.3 GPM. The results of this test are shown in FIG. 5. At time "A", the oil flow rate is decreased from 1.4 GPM to 0.3 GPM. In this test, the predetermined temperature of the stator laminated stack for initiation of output limiting operation was established at 136 degrees C. This was determined to correlate to a housing bolt temperature of approximately 97 degrees C. Shortly after stator laminated stack temperature reached 136 degrees C., at time "B", the thermal protection device, sensing the over temperature condition through ground strap temperature, effected the modulation of the power FET, limiting the field current.

As a result of the temperature lag between the laminated stack temperature and the ground strap conductor 434 temperature, some rise in temperature is observed in laminated stack temperature after initiation of current limiting operation (see time "B" to time "C"). At time "C", the heat generated by the alternator has dropped below the heat removal capacity of the coolant oil which is most clearly seen in the stator lead temperature which drops rapidly. This is further reflected in the temperature of the laminated stack which drops below the temperature limit at time "D".

The thermal protection device in this test was designed to sense temperature indirectly and a temperature lag exists between the laminated stack temperature and the ground strap, where the temperature is sensed. The resultant lag in sensing the removal of the over temperature condition results in the output current being initially limited slightly more than necessary for a given over temperature condition. Consequently, the field current is dropped lower than its steady state value for a given oil flow rate. Once the temperatures within the alternator fall below the critical temperature, indicating that the alternator is once more operating within design temperatures, the thermal protection device gradually allows field current to increase to a new steady state value. This is shown at time "D" where the voltage begins to increase, resulting in alternator temperatures also increasing.

At time "E", before the system returned to a new reduced output steady state condition, the oil flow was further reduced to 0.2 GPM. As seen in FIG. 5, the thermal protection device further restricted output current at time "F". Full oil flow was resumed at time "G" and all limitation on field current was quickly removed as reflected in field voltage being returned to its set point.

A final test was initiated at time "H" where oil flow was sharply reduced to 0.2 GPM. The resulting over temperature condition was sensed at time "I", and the outlet field current quickly reduced as evidenced by the drop in field voltage. Even this catastrophic reduction in heat removal capacity resulted in only a brief period of operation above the desired maximum temperature, and the laminated stack exceeded the predetermined limit by only a couple of degrees.

Those of skill in the art will realize that while a particular embodiment of the present invention has been described herein, other embodiments are possible in practicing the present invention. By way of example, but not limitation, various means of determining the temperature of the alternator exist including bi-metallic strips and thermocouples. It is also possible to determine alternator temperature from the outlet temperature of the coolant oil. From this information, the temperature of the alternator may be determined. Alternatively, a temperature sensing device could be placed in physical contact with the stator laminated stack or other limiting component to sense temperature. By way of further example, the means for variably controlling current may comprise a device which regulates the output current in discreet steps, such as a stepping circuit or a switching circuit, possibly in conjunction with a sequential shutdown or patterned operation of load subsystems. Also, load subsystem shutdown and/or operation could be logic based using a microprocessor control. Additionally, the op-amp circuit of FIG. 3 could be replaced by an appropriately programmed microprocessor capable of controlling a power FET or semi-conductor as a result of temperature based input signals. Also, any type of power transistor or semi-conductor device in addition to power FETs can be used to control the output current of the alternator so long as they are capable of handling the current load and can be modulated by an input signal indicative of alternator temperature.

Those of skill in the art will further realize that the invention as described herein may be easily modified so as to provide additional benefit. By way of example, but not of limitation, an alarm or indicator light may be connected across power FET 356 such that when current is not allowed to flow due to an over temperature condition as described above, the alarm or indicator light provides an indication to the operator that the alternator is in an over temperature condition. The operator, being thus alerted, may take corrective action to correct the over temperature condition. Additionally, a device may be connected to point 318 to provide an indication of the alternator temperature to the operator. These and other variations are within the scope of the present invention.

The invention herein described provides a significant advantage over the prior art systems. The present invention is capable of protecting an alternator from over temperature conditions while allowing the useful output of the alternator, the invention varies the degree of current limitation based upon the actual temperature of the alternator, in one embodiment, no penetrations into a fluid filled system are required, the device is easily installed on existing or newly manufactured systems, it is reliable, of simple construction, and compatible with other subsystems used in controlling operation of an alternator. Those of skill in the art will recognize that these significant benefits and others are provided by the present invention.

What is claimed is:

1. A thermal protection device for controlling the temperature of at least one alternator component in an alternator having an exterior housing and providing electrical output current from an output to a load, comprising:

means for sensing the temperature of the at least one alternator component and producing signals representative of said temperature;

means for variably controlling output current from the alternator, said means for variably controlling output current being operably connected to the means for sensing temperature and controlling the output current in response to said signals of said means for sensing so that as the temperature of the at least one alternator component increases the means for variably controlling output current reduces the output current of the alternator and as the temperature of the at least one alternator component decreases the output current of the alternator is increased.

2. The thermal protection device of claim 1, wherein the means for sensing temperature comprises a thermistor.

3. The thermal protection device of claim 1, wherein said means for sensing temperature is attached to the exterior housing of the alternator and the exterior housing is capable of conducting heat from the at least one alternator component to provide an exterior housing temperature proportional to the at least one alternator component temperature, so that the means for sensing temperature can sense the proportional temperature of the alternator exterior housing.

4. The thermal protection device of claim 1, wherein the means for variably controlling output current comprises a current modulating circuit.

5. The thermal protection device of claim 4, wherein said alternator comprises a field winding having a field current passing therethrough and wherein the current modulating circuit comprises:

a power transistor operably connected to the field winding of the alternator, said power transistor having a base and being controlled by a base voltage; and an op-amp circuit connected to the base of the power transistor such that the op-amp circuit controls the base voltage of the power transistor, the op-amp circuit being operably connected to the means for sensing temperature so that as temperature of the at least one alternator component increases, the op-amp circuit reduces the base voltage of the power transistor such that the alternator field current allowed to pass through the power transistor is decreased thereby decreasing the output current.

6. The thermal protection device of claim 5, wherein the op-amp circuit comprises:

a first op-amp having first and second inputs and a variable current output being switchable between a high current output and a low current output depending on the voltage levels at the first and second inputs, said first input of said first op-amp being operably connected to the means for sensing temperature and responsive to said signals to cause said first op-amp to switch to high current output when the temperature exceeds a predetermined level;

a capacitor, said capacitor connected to the first op-amp switchable current output and capable of being charged by the high current output of the first op-amp;

a second op-amp having a first and a second input for comparing voltage and having an output switchable between a first output voltage and a second output voltage, said first input of said second op-amp connected to the capacitor and said second input connected to a first reference voltage, the output voltage operably connected to the base of the power transistor such that when the second op-amp is switched to the first output voltage, alternator field current is allowed to pass through the power transistor and when the second op-amp is switched to the second output voltage, alternator field current allowed to pass through the power transistor is decreased;

said means for sensing temperature comprising a means for providing a voltage level representative of said temperature to said first input of said first op-amp; and means for providing a first voltage threshold connected to the second input of the first op-amp, whereby as the temperature of the at least one alternator component increases, the voltage at the first input increases until it exceeds the first voltage threshold on the second input and the first op-amp output switches to high current output thereby passing current to charge said capacitor until the capacitor charge exceeds the first reference voltage and the second op-amp switches to the second output voltage thereby reducing the voltage at the base of the power transistor such that the alternator field current allowed to pass through the power transistor is decreased.

7. The thermal protection device of claim 6, the thermal protection device further comprising:

means for switching the first op-amp to a low current output in response to the base voltage being reduced by the second output voltage;

means for providing a second reference voltage connected to the second input of the second op-amp, the second reference voltage lower than the first reference voltage; and a discharge path for the capacitor, connected so that when the base voltage is decreased by the second output voltage, the first op-amp current output is switched low, the capacitor is allowed to discharge until the capacitor charge reaches the second reference voltage, the second op-amp output switches to the first output voltage and the base voltage is increased and alternator field current allowed to pass through the power transistor is increased.

8. The thermal protection device of claim 5, wherein the means for sensing temperature comprises a thermistor.

9. The thermal protection device of claim 1, further comprising means for establishing a temperature set point for the at least one alternator component, such that the means for variably controlling output current does not reduce the allowed output current unless the temperature of the at least one alternator component is above the temperature set point.

10. The thermal protection device of claim 9, wherein the reduction in allowed output current is proportional to the temperature difference between the temperature set point and the temperature of the at least one alternator component, such that as the at least one alternator component temperature increases above the temperature set point, less current is allowed to be outputted by the alternator, and as the at least one alternator component temperature decreases from above the temperature set point toward the temperature set point, more current is allowed to be outputted by the alternator.

11. A thermal protection device for controlling the internal temperature of a high output capacity motor vehicle alternator by controlling the flow of output current generated by the alternator, the alternator having a housing configured to hold operable components of the alternator, the housing being capable of conducting heat generated by the operable components of the alternator so that the temperature of the housing is proportional to the internal temperature of the alternator, said device comprising:

means for sensing temperature of the housing and producing signals representative of said temperature; and means for controlling allowed output current of the alternator operatively connected to the means for sensing temperature, so that as the temperature of the housing increases, the means for controlling allowed output current reduces the allowed output current of the alternator in response to the increased temperature of the alternator housing.

12. The thermal protection device of claim 11, wherein the means for sensing temperature comprises a thermistor.

13. The thermal protection device of claim 11, wherein the means for controlling allowed output current comprises a current modulating circuit.

14. The thermal protection device of claim 13, wherein said alternator comprises a field winding passing a field current therethrough and wherein the current modulating circuit comprises:

a power transistor operably connected to the field winding of the alternator, said power transistor having a base and being controlled by a base voltage; and an op-amp circuit connected to the base of the power transistor such that the op-amp circuit controls the base voltage of the power transistor, the op-amp circuit being operably connected to the means for sensing temperature so that as temperature of the alternator increases, the op-amp circuit reduces the base voltage of the power transistor such that the alternator field current allowed to pass through the power transistor is decreased.

15. The thermal protection device of claim 14, wherein the op-amp circuit comprises:

a first op-amp having first and second inputs and a variable current output being switchable between a high current output and a low current output depending on the voltage levels at the first and second inputs, said first input of said first op-amp being operably connected to the means for sensing temperature and responsive to said signals to cause said first op-amp to switch to high current output when the temperature of the housing exceeds a predetermined level;

a capacitor, said capacitor connected to the first op-amp switchable current output and capable of being charged by the high current output of the first op-amp;

a second op-amp having a first and a second input for comparing voltage and having an output switchable between a first output voltage and a second output voltage, said first input of said second op-amp connected to the capacitor and said second input connected to a first reference voltage, the output voltage operably connected to the base of the power transistor such that when the second op-amp is switched to the first output voltage, alternator field current is allowed to pass through the power transistor and when the second op-amp is switched to the second output voltage, alternator field current allowed to pass through the power transistor is decreased;

said means for sensing temperature comprising a means for providing a voltage level representative of said temperature to said first input of said first op-amp; and means for providing a first voltage threshold connected to the second input of the first op-amp, whereby as the temperature of the alternator housing increases, the voltage at the first input increases until it exceeds the first voltage threshold on the second input and the first op-amp output switches to high current output thereby passing current to charge said capacitor until the capacitor charge exceeds the first reference voltage and the second op-amp switches to the second output voltage thereby reducing the voltage at the base of the power transistor such that the alternator field current allowed to pass through the power transistor is decreased.

16. The thermal protection device of claim 15, the thermal protection device further comprising:

means for switching the first op-amp to a low current output in response to the base voltage being reduced by the second output voltage;

means for providing a second reference voltage connected to the second input of the second op-amp, the second reference voltage lower than the first reference voltage; and a discharge path for the capacitor, connected so that when the base voltage is decreased by the second output voltage, the first op-amp current output is switched low, the capacitor is allowed to discharge until the capacitor charge reaches the second reference voltage, the second op-amp output switches to the first output voltage and the base voltage is increased and alternator field current allowed to pass through the power transistor is increased.

17. The thermal protection device of claim 15, wherein the means for sensing temperature comprises a thermistor.

18. The thermal protection device of claim 11, further comprising means for establishing an alternator housing temperature set point, such that the means for controlling output current does not reduce the allowed output current unless the alternator housing temperature is above the temperature set point.

19. The thermal protection device of claim 18, wherein the reduction in allowed output current is proportional to the temperature difference between the temperature set point and the alternator housing temperature, such that as the alternator housing temperature increases above the temperature set point, less current is allowed to be outputted by the alternator, and as the alternator housing temperature decreases from above the temperature set point toward the temperature set point, more current is allowed to be outputted by the alternator.

20. In combination:
an alternator having an exterior housing and providing electrical output current from an output to a load;
temperature sensor operably connected to the alternator and producing signals representative of the temperature being sensed; and
a control circuit that will variably control output current from the alternator, the control circuit operably connected to the temperature sensor so that as the temperature being sensed increases, the control circuit reduces the allowed output current of the alternator and as the temperature being sensed decreases the control circuit increases the allowed output current of the alternator.

21. The combination of claim 20, wherein the temperature sensor comprises a thermistor.

22. The combination of claim 20, wherein said temperature sensor is attached to the exterior housing of the alternator and the housing is capable of conducting heat generated internally by the alternator to provide a housing temperature representative of the temperature of the alternator housing.

23. The combination of claim 20, wherein the control circuit comprises a current modulating circuit.

24. The combination of claim 23, wherein said alternator has a field current passing through a field winding and wherein the current modulating circuit comprises:
a power transistor operably connected to the field winding of the alternator, said power transistor having a base and being controlled by a base voltage; and
an op-amp circuit connected to the base of the power transistor such that the op-amp circuit controls the base voltage of the power transistor, the op-amp circuit being operably connected to the means for sensing temperature so that as temperature being sensed increases, the op-amp circuit reduces the base voltage of the power transistor such that the alternator field current allowed to pass through the power transistor is decreased.

25. The combination of claim 24, wherein the op-amp circuit comprises:
a first op-amp having first and second inputs and a variable current output being is switchable between a high current output and a low current output depending on the voltage levels at the first and second inputs, said first input of said first op-amp being operably connected to the temperature sensor and responsive to said signals to cause said first op-amp to switch to high current output when the temperature sensed exceeds a predetermined level;
a capacitor, said capacitor connected to the first op-amp switchable current output and capable of being charged by the high current output of the first op-amp;
a second op-amp having a first and a second input for comparing voltage and having an output switchable between a first output voltage and a second output voltvoltage, said first input of said second op-amp connected to the capacitor and said second input connected to a reference voltage, the output voltage operably connected to the base of the power transistor such that when the second op-amp is switched to the first output voltage, alternator field current is allowed to pass through the power transistor and when the second op-amp is switched to the second output voltage, alternator field current allowed to pass through the power transistor is decreased;
said temperature sensor signals comprising voltage levels representative of said temperature; and
a voltage threshold connected to the second input of the first op-amp,
whereby as the temperature sensed increases, the voltage at the first input increases until it exceeds the voltage threshold on the second input and the first op-amp output switches to high current output thereby passing current to charge said capacitor until the capacitor charge exceeds the reference voltage and the second op-amp switches to the second output voltage thereby reducing the voltage at the base of the power transistor such that the alternator field current allowed to pass through the power transistor is decreased.

26. The combination of claim 25, the op-amp circuit further comprising a discharge path for the capacitor, and wherein:
said voltage threshold is switchable between a first voltage level and a second voltage level, such that when the temperature sensed exceeds the predetermined level and the first voltage threshold is selected, the first op-amp is switched to high current output, and when the temperature sensed exceeds the predetermined level and the second voltage threshold is selected, the first op-amp is switched to low current output,
said voltage threshold being responsive to the base voltage, such that when the base voltage allows increased field current to pass through the power transistor, the first voltage threshold is selected and when base voltage is reduced such that the alternator field current allowed to pass through the power transistor is decreased, the second voltage threshold is selected; and
said reference voltage is switchable between a first reference voltage and a second reference voltage, the second reference voltage being less than the first reference voltage
said reference voltage being responsive to the base voltage, such that when the base voltage allows increased field current to pass through the power transistor, the first reference voltage is selected and when base voltage is reduced such that the alternator field current allowed to pass through the power transistor is decreased, the second reference voltage is selected,
whereby as the sensed temperature increases, the voltage at the first input increases until it exceeds the first voltage threshold on the second input and the first op-amp output switches to high current output thereby passing current to charge said capacitor until the capacitor charge exceeds the first reference voltage and the second op-amp switches to the second output voltage thereby reducing the voltage at the base of the power transistor such that the alternator field current allowed to pass through the power transistor is decreased and switching to the second reference voltage and to the second voltage threshold such that the second reference voltage on the second input of the first op-amp is decreased below the voltage on the first input of the first op-amp and the output of the first op-amp is switched to low current output and the capacitor is allowed to discharge, and such that the second reference voltage on the second input of the second op-amp is decreased below the initial voltage level on the second input of the second op-amp, so that the output of the second op-amp is maintained at the second output voltage until such time as the capacitor has discharged to a voltage lower than the second reference voltage.

27. The combination of claim 20, wherein the temperature sensor comprises a thermistor.

28. The combination of claim 20, further comprising a temperature set point, such that control circuit does not reduce the allowed output current unless the sensed temperature is above the temperature set point.

29. The combination of claim 28, wherein the reduction in allowed output current is proportional to the temperature difference between the temperature set point and the sensed temperature, such that as the sensed temperature increases above the temperature set point, less output current is allowed to be outputted by the alternator, and as the sensed temperature recedes from above the temperature set point toward the temperature set point, more output current is allowed to be outputted by the alternator.

30. A method of controlling the internal temperature of an alternator by constraining the flow of output current generated by the alternator comprising the steps of:

establishing a temperature set point corresponding to a maximum desired temperature for the alternator;

determining the temperature of the alternator;

comparing the temperature of the alternator to the temperature set point;

controlling the output current of the alternator as a function of the comparison such that as the temperature of the alternator increases, the amount of output current allowed to be generated by the alternator is reduced, and as the alternator temperature decreases the amount of output current allowed to be generated by the alternator is increased.

31. The method of claim 30, wherein the step of determining the temperature of the alternator comprises the step of using a thermistor.

32. The method of claim 30, wherein the alternator comprises an exterior housing capable of conducting heat from the interior of the alternator to provide a housing temperature proportional to the internal alternator temperature and the step of determining the temperature of the alternator comprises the steps of:

determining the temperature of the exterior housing of the alternator; and adjusting the temperature set point to compensate for the difference between the internal alternator temperature and the temperature of the exterior housing.

33. The method of claim 30, wherein the step of controlling the output current of the alternator comprises the step of controlling the base voltage of a power transistor.

34. A method of controlling the internal temperature of an alternator by constraining the flow of output current generated by the alternator comprising the steps of:

providing the apparatus of claim 6;

comparing the voltage at the first input of the first op-amp to the voltage at the second input of the first op-amp;

switching said first op-amp to high current output when the voltage at the first input exceeds the voltage at the second input;

charging said capacitor with the first op-amp high current output;

comparing the voltage at the first input of the second op-amp with the voltage at the second input of the second op-amp; and switching the output of the second op-amp to the second output voltage when the voltage at the first input of the second op-amp exceeds the voltage at the second input of the second op-amp.

35. The method of claim 34, wherein the rate of charging the capacitor is proportional to the difference between the voltage at the first input and the voltage at the second input.

36. The method of claim 34, further providing the apparatus of claim 7, the method comprising the additional steps of:

switching the first op-amp to a low current output in response to second op-amp switching to the second output voltage;

providing said second voltage threshold connected to the second input of the second op-amp;

discharging the capacitor;

comparing the voltage at the first input of the second op-amp to the voltage at the second input of the second op-amp; and switching the output of the second op-amp to the first output voltage when the voltage at the first input of the second op-amp drops below the voltage at the second input of the second op-amp.

* * * * *